United States Patent
Knoll

(10) Patent No.: US 7,085,638 B2
(45) Date of Patent: Aug. 1, 2006

(54) STEERING ANGLE SENSOR ASSEMBLY INCLUDING REDUCTION GEAR AND LOGIC MODULE

(75) Inventor: Stefan Knoll, West Bloomfield, MI (US)

(73) Assignee: Robert Bosch GmbH, Stuttgart (DE)

( * ) Notice: Subject to any disclaimer, the term of this patent is extended or adjusted under 35 U.S.C. 154(b) by 86 days.

(21) Appl. No.: 10/890,532

(22) Filed: Jul. 13, 2004

(65) Prior Publication Data

US 2006/0015227 A1     Jan. 19, 2006

(51) Int. Cl.
   *B62D 15/00*   (2006.01)
(52) U.S. Cl. .............. 701/41; 250/231.15; 250/231.17; 702/151
(58) Field of Classification Search ...................... None
   See application file for complete search history.

(56) References Cited

U.S. PATENT DOCUMENTS

| | | | |
|---|---|---|---|
| 4,123,653 A | 10/1978 | Bovio | 250/231 |
| 4,788,422 A | 11/1988 | Fikowara | 250/231 |
| 5,004,915 A | 4/1991 | Umehara et al. | 250/231.14 |
| 5,065,324 A | 11/1991 | Oshita et al. | 364/424.05 |
| 5,218,769 A | 6/1993 | Tranchon | 33/1 |
| 5,243,188 A | 9/1993 | Hattori et al. | 250/231.17 |
| 5,369,583 A | 11/1994 | Hazelden | 364/424.05 |
| 5,525,885 A | 6/1996 | Sato | 318/632 |
| 5,531,127 A | 7/1996 | Hazelden | 73/862.336 |
| 5,602,544 A | 2/1997 | Takahashi et al. | 341/6 |
| 5,646,523 A * | 7/1997 | Kaiser et al. | 324/207.2 |
| 5,930,905 A | 8/1999 | Zabler | 33/1 |

(Continued)

FOREIGN PATENT DOCUMENTS

WO        WO 98/43867        10/1998

*Primary Examiner*—Michael J. Zanelli
(74) *Attorney, Agent, or Firm*—Baker & Daniels LLP

(57) ABSTRACT

A steering angle sensor assembly is for use with a vehicle having a rotatable steering mechanism. The assembly includes a first rotational indexing member operably couplable to the steering mechanism for rotation therewith. The steering mechanism and the first indexing member are each rotatable through a rotational range including a plurality of revolutions. The first indexing member defines a first rotational axis. A plurality of indexing elements are disposed on the first indexing member and circumscribe the first rotational axis. A first sensing device is positioned to sense the plurality of indexing elements as the first indexing member rotates. The first sensing device outputs a first signal representative of a rotational position of the first rotational indexing member within one of the revolutions. A second rotational indexing member defines a second rotational axis. A reduction gear mechanism operably couples the first and second indexing members. A rotational displacement of the second indexing member is less than a corresponding rotational displacement of the first indexing member. A second sensing device senses a rotational position of said second rotational indexing member and generates a second signal indicative thereof. A logic module receives the first and second signals. The logic module identifies in which one of the revolutions the first indexing member is positioned based upon the second signal and determines the rotational position of the first indexing member within the identified revolution based upon the first signal.

27 Claims, 9 Drawing Sheets

U.S. PATENT DOCUMENTS

| | | | |
|---|---|---|---|
| 6,043,483 A * | 3/2000 | Schreiber | 250/231.13 |
| 6,246,232 B1 | 6/2001 | Okumura | 324/207.2 |
| 6,248,993 B1 | 6/2001 | Bunselmeier et al. | 250/231.13 |
| 6,298,565 B1 | 10/2001 | Weber et al. | 33/1 |
| 6,304,190 B1 | 10/2001 | Blasing | 340/686.3 |
| 6,362,469 B1 | 3/2002 | Sano | 250/231.15 |
| 6,410,909 B1 | 6/2002 | Rudolph et al. | 250/231.13 |
| 6,459,389 B1 | 10/2002 | Germuth-Loffler et al. | 341/13 |
| 6,524,209 B1 | 2/2003 | Ito et al. | 475/162 |
| 6,542,088 B1 | 4/2003 | Bielski et al. | 341/15 |
| 6,578,437 B1 | 6/2003 | Moerbe | 73/862.32 |
| 6,844,541 B1 * | 1/2005 | Alsobrooks et al. | 250/231.13 |
| 2005/0050966 A1 * | 3/2005 | Recio et al. | 73/862.333 |

\* cited by examiner

STEERING ANGLE SENSOR ASSEMBLY INCLUDING REDUCTION GEAR AND LOGIC MODULE

BACKGROUND OF THE INVENTION

1. Field of the Invention

The present invention relates to steering angle sensors and, more particularly, absolute steering angle sensors.

2. Description of the Related Art

A wide variety of steering angle sensors are known in the art for providing steering angle data to vehicle systems such as vehicle stabilizing systems. Such steering angle sensors may be broadly classified as either absolute position sensors or relative position sensors.

Relative position steering angle sensors register an initial zero position when the ignition is turned on and output data that defines the change in the steering angle relative to the initial "zero" position of the steering wheel. To determine the actual steering angle position of the vehicle with such a relative position steering angle sensor, the offset between the initial steering wheel position and the "true" zero steering angle must be determined. The offset may be determined by the vehicle controller using vehicle model equations and data obtained from other vehicle sensors such as a yaw sensor and individual wheel speed sensors. This determination of the offset value may place a relatively significant computational burden on the vehicle controller.

In contrast, absolute position steering angle sensors output the actual or "true" steering angle, rather than the relative difference between the current steering angle and the initial steering wheel position when the ignition was turned on. Generally, absolute steering angle sensors place fewer computational demands on the controller but are more expensive than relative position steering angle sensors.

The steering range of a motor vehicle typically extends between four and five complete 360 degree revolutions between the left and right steering lock positions of the steering wheel. For example, the steering range may extend 1500°, i.e., four complete revolutions plus 60°. Measuring absolute steering angle over the entire steering range is typically a more complex task than providing either the absolute steering angle within just one revolution of the steering wheel or the relative steering angle, which provides no absolute measurement with respect to the true position of the steering wheel.

What is needed in the art is a cost effective device for providing an accurate measurement of absolute steering angle over the entire steering range of a vehicle.

SUMMARY OF THE INVENTION

The present invention provides an inexpensive absolute position steering angle sensor that does not impose a substantial computational burden on the vehicle controller.

The invention comprises, in one form thereof, a steering angle sensor assembly for use with a vehicle having a rotatable steering mechanism. The assembly includes a first rotational indexing member operably couplable to the steering mechanism for rotation therewith. The steering mechanism and the first indexing member are each rotatable through a rotational range including a plurality of revolutions. The first indexing member defines a first rotational axis. A plurality of indexing elements are disposed on the first indexing member and circumscribe the first rotational axis. A first sensing device is positioned to sense the plurality of indexing elements as the first indexing member rotates. The first sensing device outputs a first signal representative of a rotational position of the first rotational indexing member within one of the revolutions. A second rotational indexing member defines a second rotational axis. A reduction gear mechanism operably couples the first and second indexing members. A rotational displacement of the second indexing member is less than a corresponding rotational displacement of the first indexing member. A second sensing device senses a rotational position of said second rotational indexing member and generates a second signal indicative thereof. A logic module receives the first and second signals. The logic module identifies in which one of the revolutions the first indexing member is positioned based upon the second signal and determines the rotational position of the first indexing member within the identified revolution based upon the first signal.

The invention comprises, in another form thereof, a steering angle sensor assembly for use with a vehicle having a steering wheel. The assembly includes a tone ring operably coupled to the steering wheel such that the tone ring rotates in response to rotation of the steering wheel. A first sensing device determines a rotational position of the tone ring and outputs a first signal indicative of the rotational position of the tone ring. A reduction gear mechanism operably couples the tone ring and a rotating member such that a rotational displacement of the rotating member is less than a corresponding rotational displacement of the tone ring. A second sensing device is disposed proximate the rotating member and includes a light emitter and a light detector. The light emitter or the light detector includes a plurality of components. Rotation of the rotating member brings each of the components of the emitter or the detector into registration with the other of the emitter and the detector at a respective one of a plurality of rotational positions of the rotating member. The detector generates a second signal representative of the rotational position of the rotating member when one of the components of the emitter or the detector is in registration with the other of the emitter and the detector. A logic module receives and processes the first and second signals and outputs a third signal representative of an absolute rotational position of the steering wheel.

The invention comprises, in yet another form thereof, a method of determining a rotational position of a steering wheel, including operably coupling a first rotational indexing member to the steering wheel for rotation therewith. The steering wheel and the first indexing member are each rotatable through a rotational range including a plurality of revolutions. A plurality of indexing elements are disposed on the first indexing member. A first sensing device is positioned to sense the plurality of indexing elements as the first indexing member rotates. The first sensing device outputs a first signal representative of a rotational position of the first rotational indexing member within one of the revolutions. A second rotational indexing member is provided. The first and second indexing members are operably coupled together via a reduction mechanism wherein a rotational displacement of the second indexing member is less than a corresponding rotational displacement of the first indexing member. A second sensing device including a first component and a plurality of second components is provided. The second indexing member is rotated to thereby bring each of the plurality of second components into registration with the first component at a respective one of a plurality of rotational positions of the second indexing member. The second sensing device generates a second signal representative of the rotational position of the second indexing member when one of the second components is in registration with the first component. In which one of the revolutions the first indexing member is positioned is identified. The identifying is based upon the second signal. The rotational position of the first indexing member within the identified revolution is determined. The determining is based upon the first signal.

The invention comprises, in a further form thereof, a steering angle sensor assembly for use with a vehicle having a rotatable steering mechanism. A first rotational indexing member is operably couplable to the steering mechanism for rotation therewith. The steering mechanism and the first indexing member are each rotatable through a rotational range of greater than 360°. A first sensing device senses a rotational position of the first rotational indexing member and generates a first signal indicative thereof. A reduction gear mechanism operably couples the first indexing member and a second indexing member. A rotational displacement of the second indexing member is less than a corresponding rotational displacement of the first indexing member. A second sensing device senses a rotational position of the second rotational indexing member and generates a second signal indicative thereof. A processor receives the first and second signals. The processor identifies a reference rotational position previously occupied by the first indexing member. The identifying of the reference rotational position is based upon the second signal. The processor determines a change in the rotational position of the first indexing member relative to the reference rotational position. The determining of the change in the rotational position of the first indexing member is based upon the first signal.

An advantage of the present invention is that it cost effectively provides an autonomous and accurate measurement of absolute steering angle over the entire steering range of a vehicle.

Another advantage is that a separate logic module is provided to process the output signals of the light detectors, and thus the processing burden placed upon the vehicle controller ("control unit") is reduced and system reliability is increased. One reason why there is a reduced processing burden on the control unit in the present invention is that the signal from the logic module, i.e., the Controller Area Network (CAN) signal, is monitorable. Additionally, only two power lines and two signal lines for CAN are necessary. In contrast, a sensor without the logic module would have to deliver all of the sensor's signals via a greater number of wires, and the signals may not be monitorable. Signals that are not electrically monitorable and that are transmitted via a greater number of wires decrease the reliability and add to the computational burden of the attached control unit by requiring additional logic in the control unit.

BRIEF DESCRIPTION OF THE DRAWINGS

The above mentioned and other features and objects of this invention, and the manner of attaining them, will become more apparent and the invention itself will be better understood by reference to the following description of an embodiment of the invention taken in conjunction with the accompanying drawings, wherein:

FIG. 7b is a perspective view of yet another embodiment of the lower sensing device of FIG. 7a.

FIG. 7c is a perspective view of a further embodiment of the lower sensing device of FIG. 7a.

Figure 1:
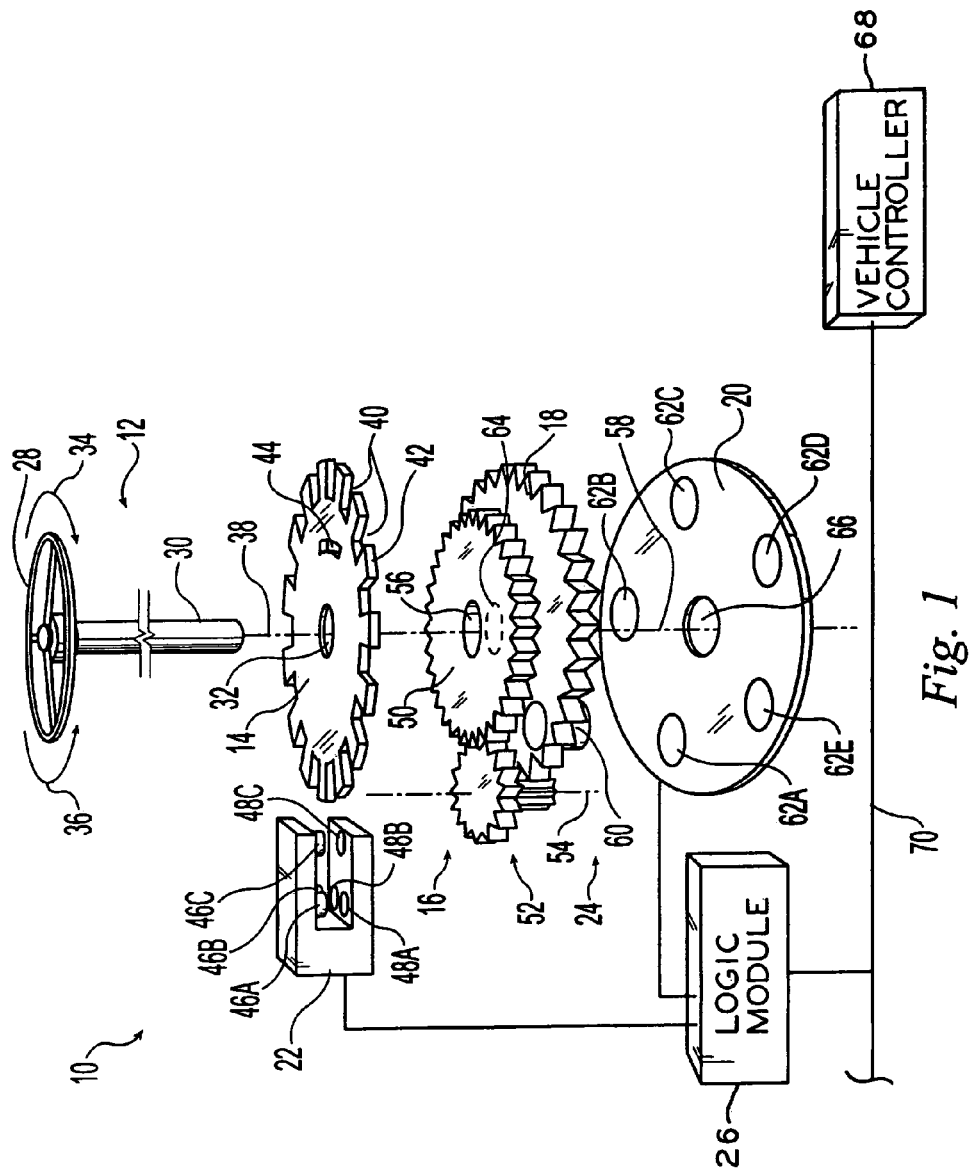
FIG. 1 is an exploded view of a steering angle sensor assembly in accordance with one embodiment of the present invention.

Corresponding reference characters indicate corresponding parts throughout the several views. Although the exemplification set out herein illustrates an embodiment of the invention, the embodiment disclosed below is not intended to be exhaustive or to be construed as limiting the scope of the invention to the precise form disclosed.

DESCRIPTION OF THE PRESENT INVENTION

Referring now to the drawings and particularly to FIG. 1, there is shown one embodiment of a steering wheel sensor assembly 10 of the present invention, including a steering mechanism 12, a first rotational indexing member 14, a reduction gear mechanism 16, a second rotational indexing member 18, a mounting ring member 20, a first sensing device 22, a second sensing device 24, and a processor in the form of a logic module 26. Steering mechanism 12 includes a steering wheel 28 attached to a steering shaft or steering column 30.

First rotational indexing member 14 may be in the form of a tone ring that is operably coupled to steering mechanism 12 for rotation therewith. That is, tone ring 14 rotates in response to rotation of steering wheel 28. More particularly, steering column 30 may extend through a central throughhole 32 of tone ring 14 such that steering column 30 is fixedly attached to tone ring 14. Steering column 30 may include a groove (not shown) for receiving tone ring 14. One or more fasteners (not shown) may be used to secure tone ring 14 to steering column 30.

Both steering mechanism 12 and tone ring 14 are rotatable in both a clockwise direction indicated by arrow 34 and a counterclockwise direction indicated by arrow 36. Steering mechanism 12 and tone ring 14 are each rotatable through a rotational range including a plurality of revolutions. For example, steering mechanism 12 and tone ring 14 may each be rotatable through a rotational range of between four and five revolutions between a left steering lock position and a right steering lock position. In one embodiment, both steering mechanism 12 and tone ring 14 are rotatable through a rotational range of approximately 1500°, i.e., four 360° revolutions plus an additional 60°. The rotational range may be evenly split between directions to the left and directions to the right of a straight ahead steering direction. For example, the rotational range may extend 750° to the left of a straight ahead steering direction and 750° to the right of the straight ahead steering direction.

Tone ring 14 defines a rotational axis 38 which may pass approximately through the center of throughhole 32. Both steering mechanism 12 and tone ring 14 may rotate about rotational axis 38. Tone ring 14 includes a plurality of first indexing elements in the form of radially oriented, rectangular throughslots 40 adjacent a perimeter 42 of tone ring 14. Throughslots 40 may be evenly spaced around the entire perimeter 42 to thereby circumscribe axis 38. Tone ring 14 is shown as having only fifteen throughslots 40 in FIG. 1 for ease of illustration. However, it is to be understood that tone ring 14 may have one hundred or more throughslots 40. Tone ring 14 also includes a circumferentially oriented second indexing element in the form of an arcuate throughslot or index window 44 that may be disposed radially inwardly of throughslots 40. In one embodiment, index window 44 extends approximately between 14° and 20° in a circumferential direction around axis 38.

First sensing device 22 includes light emitters 46A, 46B, 46C arranged to emit light toward respective light detectors 48A, 48B, 48C. First sensing device 22 may be positioned such that tone ring 14 is partially disposed between light emitters 46A, 46B, 46C and light detectors 48A, 48B, 48C. More particularly, first sensing device 22 may be positioned such that light emitters 46A, 46B emit light to respective light detectors 48A, 48B through throughslots 40 of tone ring 14. Moreover, first sensing device 22 may be positioned such that arcuate index window 44 may be aligned between light emitter 46C and light detector 48C such that light emitter 46C may emit light to light detector 48C therethrough.

Reduction gear mechanism 16 is positioned between tone ring 14 and second rotational indexing member 18, which may be in the form of a lower indexing gear. Reduction gear mechanism 16 operably couples tone ring 14 and lower indexing gear 18 together such that a rotational displacement of indexing gear 18 is less than a corresponding rotational displacement of tone ring 14. For example, in one embodiment, the angular displacement of tone ring 14 is five times greater than the angular displacement of indexing gear 18.

In the embodiment shown, reduction gear mechanism 16 includes an upper reduction gear 50 disposed in meshing relationship with an intermediate gear device 52 that rotates about an axis 54. In turn, intermediate gear device 52 is disposed in meshing relationship with lower indexing gear 18. Upper reduction gear 50 may be operably coupled to tone ring 14 through steering column 30, to which tone ring 14 may be attached. More particularly, steering column 30 may be received in a central throughhole 56 in upper reduction gear 50 such that steering column 30 is fixedly attached to upper reduction gear 50. Steering column 30 may include a groove (not shown) for receiving upper reduction gear 50. One or more fasteners (not shown) may be used to secure upper reduction gear 50 to steering column 30.

Lower indexing gear 18 defines a second rotational axis 58 about which gear 18 rotates. In the embodiment shown, axis 58 is coincident with rotational axis 38 defined by tone ring 14. However, it is also possible for axis 58 to be offset in a horizontal direction from axis 38. Lower indexing gear 18 may be rotatably coupled to upper reduction gear 50, such as by a bearing (not shown), to allow gear 50 to rotate at a faster rotational speed than gear 18.

Second sensing device 24 may be disposed proximate rotating member 18 and may include a light emitter and a light detector. In the embodiment shown in FIG. 1, sensing device 24 includes a light emitter 60 that faces and emits light toward a light detector 62. Light emitter 60 may be in the form of a light emitting diode (LED) mounted on reduction gear mechanism 18. LED 60 may emit visible light, infrared (IR) light, or light in some other frequency range of the electromagnetic spectrum.

Light detector 62 includes a plurality of components in the form of photodiodes 62A, 62B, 62C, 62D, 62E mounted on the stationary mounting ring 20. Steering column 30 may extend through throughholes 32, 56 and through a throughhole 64 in lower indexing gear 18 to be rotatably received in a central throughhole or recess 66 in mounting ring 20. Recess 66 may include a bearing (not shown) to allow steering column 30 to rotate freely within recess 66 of the fixed mounting ring 20.

Logic module 26 may be in electrical communication with each of photodiodes 62A–E. Logic module 26 may also be in electrical communication with light emitters 46, light detectors 48, and a vehicle controller 68 via a Controller Area Network (CAN) bus 70, or some similar bus. Through bus 70, logic module 26 may also be in communication with other devices within the vehicle that are in need of steering angle data.

During use, the turning of steering wheel 28 by the user after engine ignition causes tone ring 14 to correspondingly rotate about axis 38. As tone ring 14 rotates, throughslots 40 pass between light emitters 46A, 46B and corresponding light detectors 48A, 48B. From the output signals of light detectors 48A, 48B, logic module 26 can track the rotation of tone ring 14 and thereby determine the rotational position and rotational direction of tone ring 14 without regard to which of the several possible revolutions within the 1500° rotational range that tone ring 14 may be positioned in. That is, the interaction of cutouts 40 with first sensing device 22 allows logic module 26 to determine the direction and magnitude of changes in the steering wheel angle. The monitoring of tone ring 14 may provide information on the rotational position of steering wheel 28 within the context of a revolution, but does not alone provide enough information to identify the revolution in which steering wheel 28 is disposed, i.e., whether the steering wheel angle is within the range of ±180° or between 180 and 540°, etc. The output of second sensing device 24 together with the information from tone ring 14, however, does provide enough information to identify the current "revolution" of steering wheel 28, as discussed in more detail below.

Figure 2:
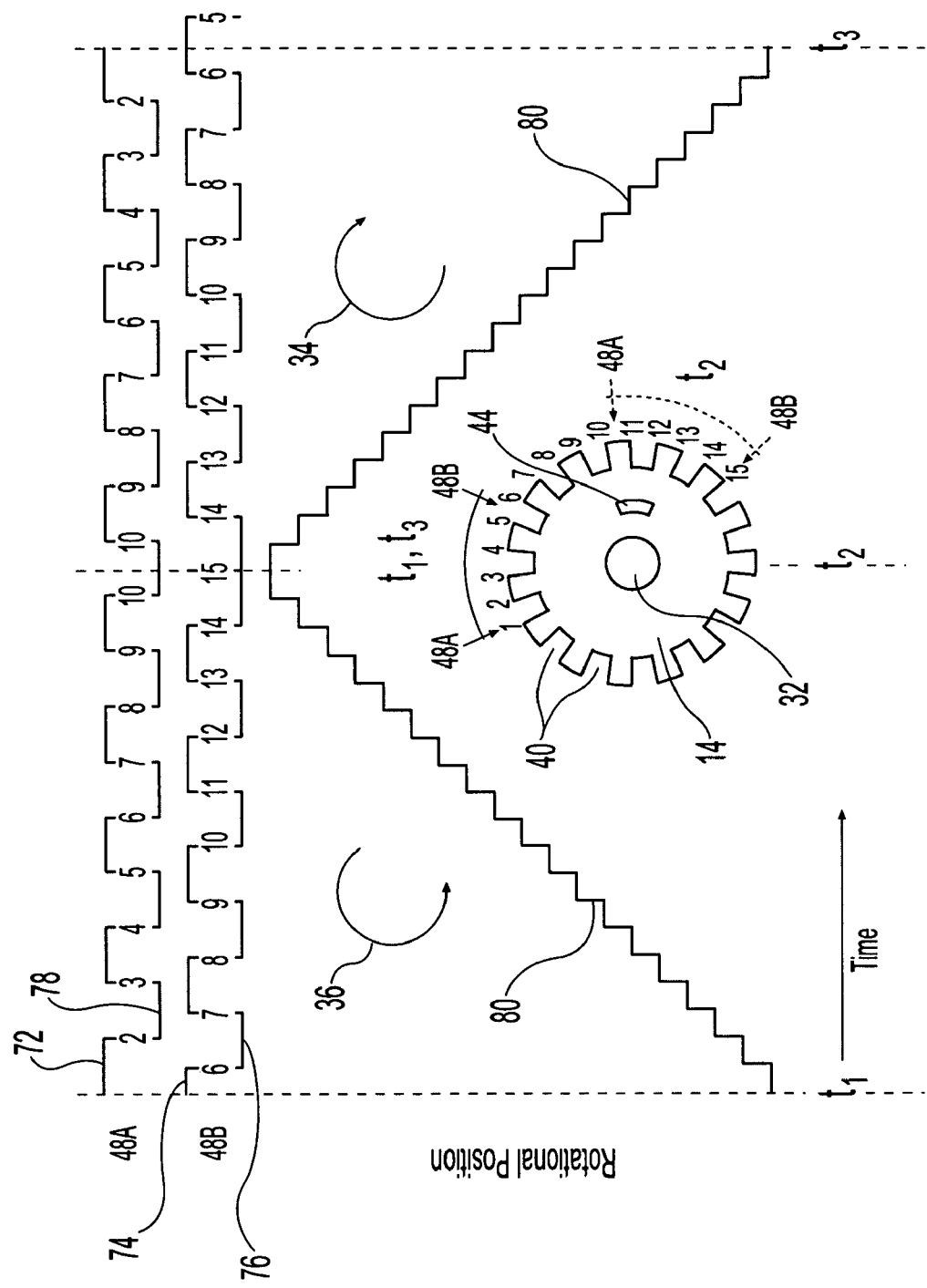
FIG. 2 is a diagram representing sensor signals precisely defining the relative steering angle position.

The output voltage of light detectors 48A, 48B as tone ring 14 rotates is illustrated near the top of the diagram of FIG. 2. The defining edges of throughslots 40 that are sensed by light detectors 48A, 48B through about half of a revolution of tone ring 14 are labeled with the numbers 1 through 15. Light detector 48B is indicated as being disposed between edges 5 and 6 at time $t_1$ and light detector 48A is disposed at edge 1. At time $t_1$, tone ring 14 begins to turn in counterclockwise direction 36. At time $t_2$, light detector 48B is disposed at edge 15 and light detector 48A is disposed between edges 10 and 11. Tone ring 14 reverses direction at time $t_2$ and begins to turn in clockwise direction 34. At time $t_3$, tone ring 14 arrives back at the same position from which it started at time $t_1$.

At time $t_1$, as tone ring 14 begins to turn in counterclockwise direction 36, light from emitter 46A begins to pass through the throughslot between edges 1 and 2 to light detector 48A. Thus, at time $t_1$, the output signal from light detector 48A goes high, as indicated at 72. Because light detector 48B is aligned with the throughslot between edges 5 and 6 at time $t_1$, the output signal of light detector 48B is high, as indicated at 74. When edge 6 reaches light detector 48B, tone ring 14 begins to block the light path between light emitter 46B and light detector 48B. The output signal of light detector 48B then goes low, as indicated at 76. A short time later, edge 2 reaches light detector 48A, and the output signal of light detector 48A goes low, as indicated at 78.

Because the signal from light detector 48A goes low immediately after the signal from light detector 48B goes low, logic module 26 can determine that tone ring 14 is rotating in counterclockwise direction 36. Conversely, after time $t_2$, the signal from light detector 48B goes low immediately after the signal from light detector 48A goes low, and thus logic module 26 can determine that tone ring 14 is rotating in clockwise direction 34.

By keeping track of the direction in which tone ring 14 is moving, and by counting the number high-low cycles or rising/falling edges of light detectors 48A and/or 48B, logic module 26 can track the rotational position of tone ring 14 relative to its rotational position at engine ignition (time $t_1$). Plot 80 illustrates the rotational position of tone ring 14 as tracked by logic module 26 between times $t_1$ and $t_3$.

The distance between light detectors 48A, 48B as indicated in FIG. 2 is larger than the distance between light detectors 48A, 48B as indicated in FIG. 1. However, the number of intervening throughslots 40 between light detectors 48A, 48B is not important to the operation of the present invention. Nevertheless, it may be useful for light detectors 48A, 48B to be disposed a non-integral number of throughslots 40 away from each other in order to allow logic module 26 to discern the direction of rotation of tone ring 14. For example, in FIG. 2, light detector 48B appears to be disposed a distance of about 2.5 throughslots 40 away from light detector 48A. That is, at time $t_1$, light detector 48B is disposed approximately in the middle of a throughslot 40, while light detector 48A is disposed at the far edge of a throughslot 40 that is two throughslots away.

Arcuate index window 44 of tone ring 14 cooperates with first sensing device 22 to identify a predefined position within each 360° rotation of tone ring 14. More particularly, index window 44 allows light emitted from light emitter 46C to reach light detector 48C once per rotation of tone ring 14. Index window 44 provides a reference with which the rotational position of tone ring 14 can be specified. However, index window 44 does not by itself provide information with which the current revolution of tone ring 14 can be determined.

During assembly, steering wheel sensor assembly 10 may be aligned or calibrated such that light detector 48C is positioned in the middle of index window 44 substantially simultaneously with light emitter 60 being aligned with one of light detectors 62A–E. Due to the 5:1 rotational ratio provided by reduction gear mechanism 16, light detector 48C may be positioned in the middle of index window 44 each time light emitter 60 is aligned with one of light detectors 62A–E throughout the rotation of tone ring 14 and lower indexing gear 18.

Figure 3:
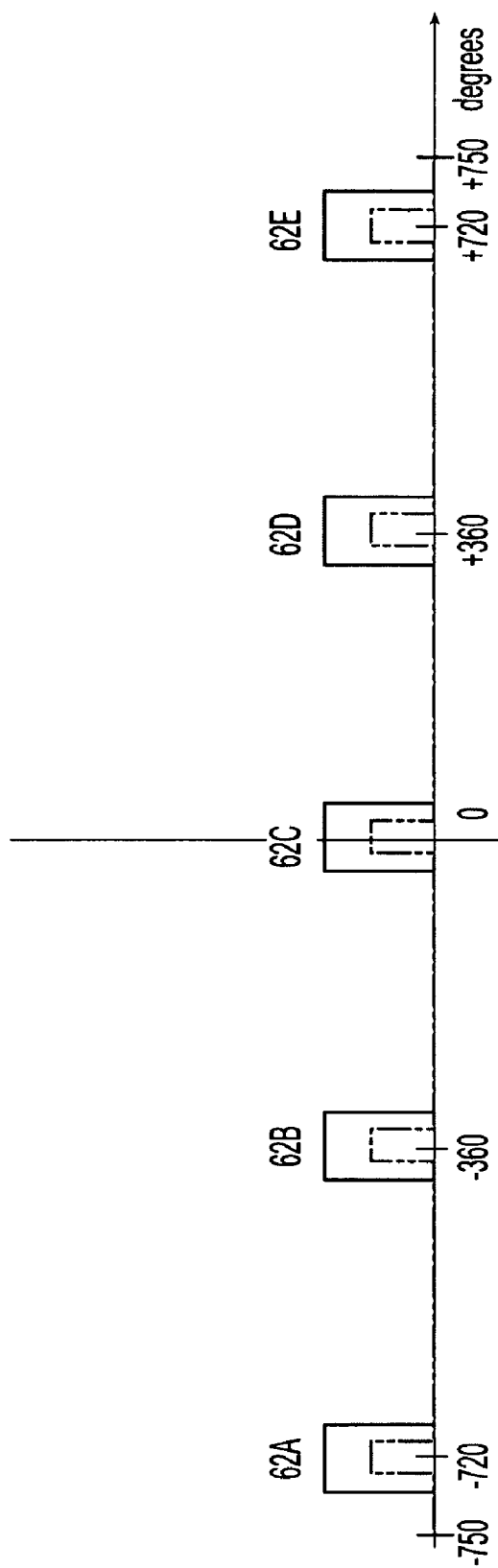
FIG. 3 is a diagram representing sensor signals defining the revolution of the steering wheel in 360 degree increments.

FIG. 3 illustrates the superimposed indexing signal outputs of light detectors 48C and 62A–E throughout a 1500° rotational range (+/−750°) of steering wheel 28. The output of light detector 48C, which is indicated in dashed lines, is shown as being smaller in magnitude than the outputs of light detectors 62A–E for ease of illustration. However, it is to be understood that the voltage output of light detector 48C may be equal to or greater than the voltage outputs of light detectors 62A–E. Moreover, the rotational range of sensitivity of light detector 48C is shown as being smaller than that of light detectors 62A–E, i.e., approximately 20° versus approximately 50°, for ease of illustration. However, it is to be understood that the rotational range of sensitivity of light detector 48C may be equal to or greater than that of light detectors 62A–E.

Logic module 26 may receive the outputs from light detectors 48C and 62A–E and determine therefrom the current "revolution" of steering wheel 28. More particularly, by discerning which of light detectors 62A–E has most recently transmitted a signal, logic module 26 may determine a reference rotational position, i.e., −720°, −360°, 0°, +360°, or +720° of steering wheel 28. From this reference rotational position, logic module 26 can calculate a more precise rotational position of steering wheel 28 based upon the outputs of light detectors 48A–C.

A number of light detectors 62, e.g., five, may be at least as great as a number of revolutions within the rotational range of tone ring 14, e.g., between four and five. Similarly, a number of light detectors 62, e.g., five, may be at least as great as the rotational range of tone ring 14 divided by 360°, e.g., 1500°/360°, or 4.17.

The output of light detector 48C may be used to identify a reference point in time $t_{ref}$, i.e., midway through a "high" output signal from light detector 48C, when the rotational position of steering wheel 28 can be determined to be one of −720°, −360°, 0°, +360° or +720°. The outputs of light detectors 48A and 48B can then be used to determine both a direction and distance of rotation of tone ring 14 since reference time $t_{ref}$. By combining a "base offset" rotational position of −720°, −360°, 0°, +360° or +720° with a direction and distance of rotation since the base offset rotational position was reached, logic module 26 may calculate a precise absolute rotational position of steering wheel 28 within the rotational range of +/−750°. Logic module 26 may transmit to vehicle controller 68 a signal representative of the identified revolution in which tone ring 14 is positioned and the rotational position of tone ring 14 within the identified revolution.

After the ignition of the vehicle has been turned on, logic module 26 is able to determine the absolute rotational position of steering wheel 28 once steering wheel 28 has been turned to a position whereat indexing signals are generated by light detector 48C and by one of light detectors 62A–E. The rotational distance through which steering wheel 28 is turned before the indexing signals can be generated is dependent upon both the number of light detectors 62 and the circumferential width of arcuate index window 44, which may be approximately between 14° and 20° in one embodiment. The absolute rotational position of steering wheel 28 may be determined once steering wheel 28 has been turned through a minimum rotational distance, which in the embodiment shown is less than 360°. It may be possible to determine the absolute rotational position after steering wheel 28 has been turned through a rotational distance of significantly less than 360°, depending upon the positions of tone ring 14 and lower indexing gear 18 when the ignition is turned on.

Figure 4:
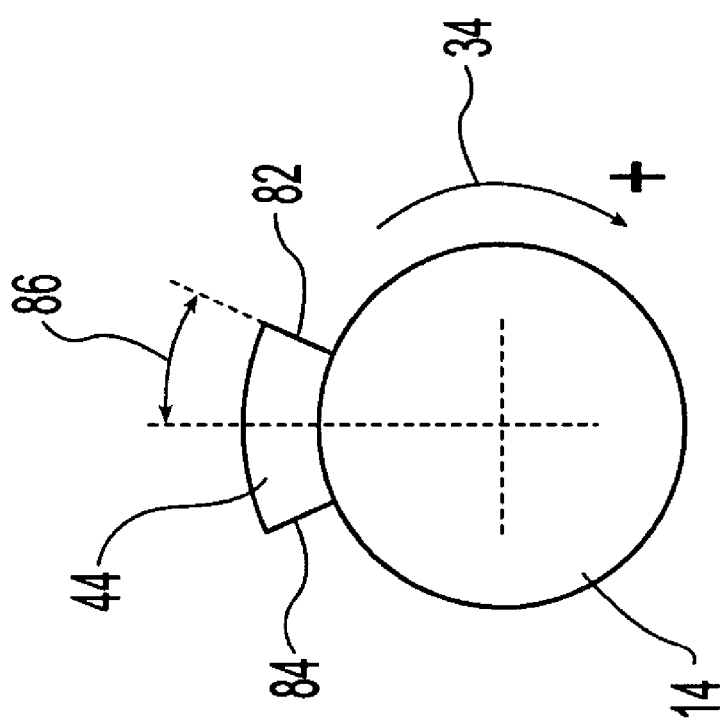
FIG. 4 is a schematic view of the tone ring.

Beginning at a reference time $t_{ref}$ at which a "base offset" rotational position of −720°, −360°, 0°, +360° or +720° is identified, logic module 26 may determine a relative change in the rotational position of tone ring 14. If tone ring 14 and lower indexing gear 18 are aligned or calibrated correctly, light detector 48C is positioned in the middle of indexing window 44 when the base offset rotational position of −720°, −360°, 0°, +360° or +720° is reached. Thus, a change in the rotational position of tone ring 14 relative to one of the base offset rotational positions may be calculated as a change relative to the rotational position whereat light detector 48C is positioned in the middle of indexing window 44. However, there may be no direct indication that light detector 48C is positioned in the middle of indexing window 44. Rather, the output of light detector 48 may only rise and fall with the passing of the outer edges of index window 44. More particularly, as illustrated in FIG. 4, when tone ring 14 rotates in a clockwise (+) direction 34, a lower transition edge 82 of indexing window 44 passes over light detector 48C to thereby cause a rising edge in the output signal of light detector 48C. That is, a "lower transition occurs." Subsequently, an upper transition edge 84 of indexing window 44 passes over light detector 48C to thereby cause a falling edge in the output signal of light detector 48C. Conversely, when tone ring 14 rotates in a counterclockwise (−) direction 36, upper transition edge 84 passes over light detector 48C to thereby cause a rising edge in the output signal of light detector 48C. That is, an "upper transition occurs." Subsequently, lower transition edge 82 passes over light detector 48C to thereby cause a falling edge in the output signal of light detector 48C.

Regardless of whether a lower transition occurred or an upper transition occurred at the previous indexing signal, the calculated rotational position of tone ring 14 relative to a base offset rotational position (−720°, −360°, 0°, +360° or +720°) may be adjusted to account for the difference between the detected position when an upper or lower transition occurred and the undetected position whereat light detector 48C is positioned in the middle of index window 44 (which corresponds to a base offset rotational position). This difference between the detected and undetected positions is a rotational distance 86, referred to herein as "x degrees", which may be equal to one-half the width of index window 44.

Figure 5:
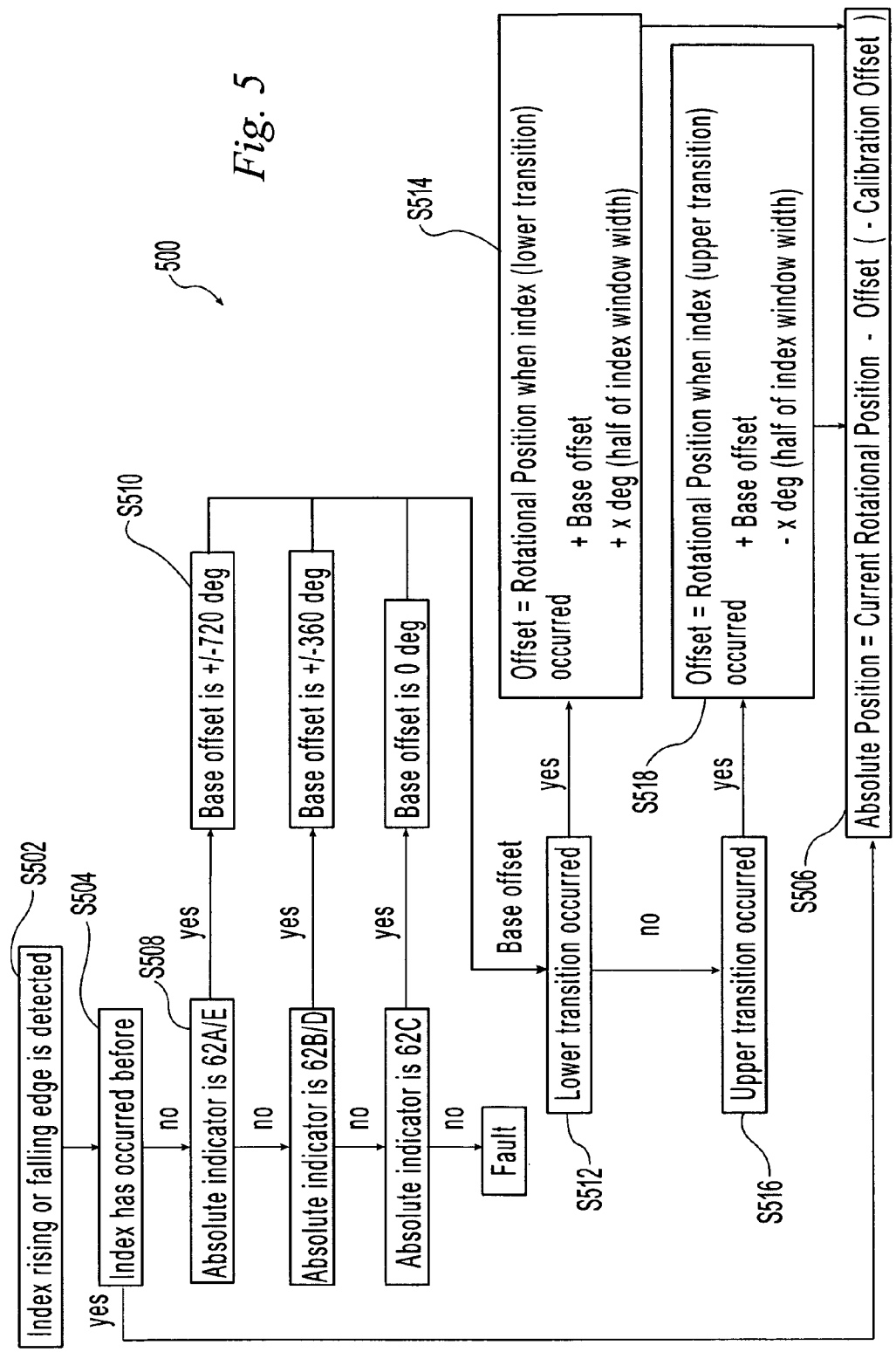
FIG. 5 is a flow chart in accordance with one embodiment of a method of the present invention for determining a rotational position of a steering wheel.

One embodiment of a method 500 of the present invention for calculating an absolute rotational position of a steering wheel is illustrated in FIG. 5. In general, method 500 may include receiving an index signal indicating a base offset rotational position (−720°, −360°, 0°, +360° or +720°), recording a position of tone ring 14 when the index signal is received, and calculating an absolute rotational position of steering wheel 28 based upon a change in the rotational position of tone ring 14 since the index signal was received.

In a first step S502, a rising edge or falling edge of an output signal, i.e., index signal, of light detector 48C and/or of one of light detectors 62A–E is detected. Each index signal from light detector 48C may occur substantially simultaneously with an index signal of one of light detectors 62A–E, as best illustrated in FIG. 3.

In a next step S504, it is determined whether another index signal has occurred previously since vehicle ignition. If so, then the value of the variable "Offset" is already known, and the process may skip down to the final step S506, which is described in more detail below. If another index signal has not occurred previously since vehicle ignition, then it is determined in step S508 whether the index signal came from one of light detectors 62A and 62E. If it did, in step S510, the value of the variable "Base offset" is set to +720 degrees if the index signal came from light detector 62A, and is set to −720 degrees if the index signal came from light detector 62E.

In a next step S512, it is determined whether a lower transition occurred in association with the index signal. That is, it is determined whether edge 82 of index window 44 caused the rising edge of the signal from detector 48C. More particularly, the timing of the rising and/or falling edges of the output signals of detectors 48A, 48B can be analyzed to determine the direction of rotation of tone ring 14, and hence which of edges 82, 84 caused the rising edge of the signal from detector 48C. If it is determined that a lower transition did occur, then in step S514 the value of the variable "Offset" is calculated to be the sum of the rotational position of tone ring 14 when the lower transition occurred, the base offset value of +/−720°, and an adjustment factor of x degrees. As discussed above, the factor of x degrees is equal to one-half the width of index window 44 and is intended to compensate for the difference between the rotational position when the lower transition occurs and the true rotational position of +/−720°.

Next, in step S506, the absolute rotational position of steering wheel 28 is calculated as the current rotational position of tone ring 14 minus the value of the variable "Offset" as calculated in S514. In effect, the absolute rotational position of steering wheel 28 may be calculated in S506 as the base offset of +/−720° with an adjustment for the change in the rotational position of tone ring 14 since the true rotational position of tone ring 14 was +/−720°, i.e., since an index signal occurred.

In one embodiment, the absolute rotational position is also adjusted for the "Calibration Offset", as indicated parenthetically in S506. The "Calibration Offset" factor may represent a measured offset between the rotational position of tone ring 14 when light emitter 60 is aligned with detector 62C and the rotational position when the wheels are truly directed "straight ahead", and/or when steering wheel 28 is truly midway between the physical limits of its rotational range. Alternatively, or in addition, the "Calibration Offset" factor may represent a measured offset between the rotational position of tone ring 14 when light emitter 60 is aligned with one of detectors 62A–E and the rotational position of tone ring 14 when light detector 48C is midway between opposite edges 82, 84 of index window 44. Thus, the "Calibration Offset" may be due to undesired or unavoidable manufacturing or assembly imperfections that nonetheless can be measured and accounted for in the calculation of the absolute rotational position, thereby negating the effects of such imperfections.

The remaining steps within method 500 are similar to the steps discussed above. It is worth noting, however, that if an upper transition occurs, as determined in S516, the sign of the "x degrees" adjustment is negative in S518 rather than positive as in S514 in order to account for light detector 48C being offset in counterclockwise direction 36 from the middle of index window 44 rather than in clockwise direction 34 as with a lower transition. Other details of the remaining steps should be clear from the above discussion, and thus are not described further herein in order to avoid needless repetition.

Figure 6:
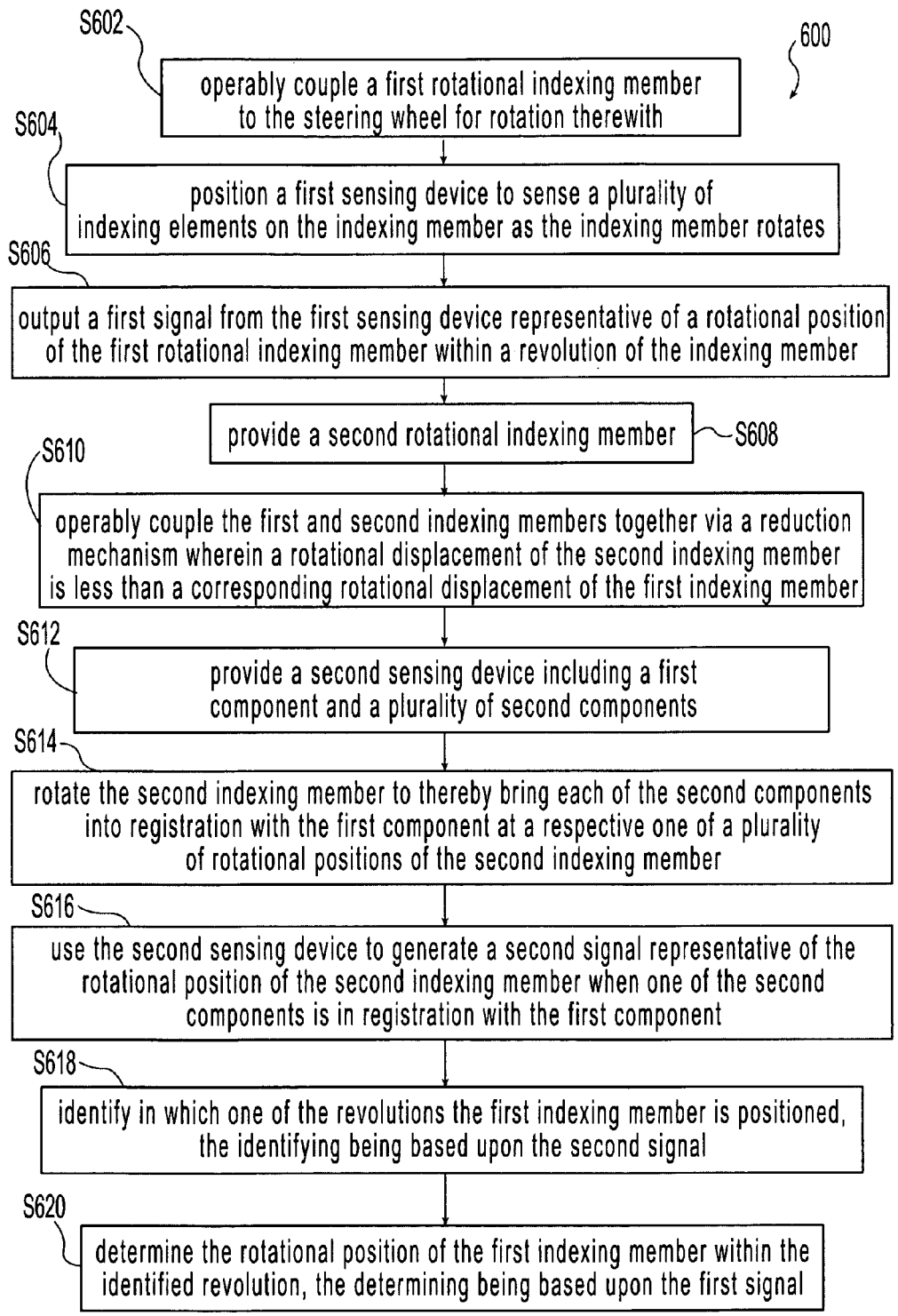
FIG. 6 is a flow chart in accordance with another embodiment of the present invention for determining a rotational position of a steering wheel.

In another embodiment, illustrated in FIG. 6, a method 600 of the present invention determines a rotational position of a steering wheel. In a first step S602, a first rotational member is operably coupled to a steering wheel for rotation therewith. In the embodiment discussed above, tone ring 14 may be operably coupled to steering wheel 28 through steering column 30 for rotation therewith.

In a next step S604, a first sensing device is positioned to sense a plurality of indexing elements on the indexing member as the indexing member rotates. For example, first sensing device 22 may be positioned to sense throughslots 40 on tone ring 14 as tone ring 14 rotates.

Next, in step S606, a first signal is output from the first sensing device representative of a rotational position of the indexing member within one of the revolutions. In the above-described embodiment, sensing device 22 may transmit to logic module 26 signals that are based upon the output signals of light detectors 48A–C and that are each representative of the rotational position of tone ring 14 within one of the several revolutions through which tone ring 14 may be at least partially rotated.

In a next step S608, a second rotational indexing member is provided. For example, lower indexing gear 18 may be provided.

In step S610, the first and second indexing members are operably coupled together via a reduction mechanism wherein a rotational displacement of the second indexing member is less than a corresponding rotational displacement of the first indexing member. As shown in FIG. 1, tone ring 14 and lower indexing gear 18 may be operably coupled together via reduction gear mechanism 16, which provides a 5:1 reduction ratio such that the rotational displacement of lower indexing gear 18 is one-fifth the rotational displacement of tone ring 14. That is, a 360° rotational displacement of tone ring 14 results in a 72° rotational displacement of lower indexing gear 18.

Next, in step S612, a second sensing device including a first component and a plurality of second components is provided. For example, a second sensing device 24 including a light emitter 60 and a plurality of light detectors 62A–E may be provided.

In a next step S614, the second indexing member is rotated to thereby bring each of the second components into registration with the first component at a respective one of a plurality of rotational positions of the second indexing member. In the above embodiment, lower indexing gear 18 is rotated to thereby bring each of the light detectors 62A–E in registration or alignment with light emitter 60 at five respective rotational positions of lower indexing gear 18. The five respective rotational positions may be spaced in 72° increments around rotational axis 58.

Next, in step S616, the second sensing device is used to generate a second signal representative of the rotational position of the second indexing member when one of the second components is in registration with the first component. In the embodiment discussed above, second sensing device 24 generates a second signal, best shown in FIG. 3, representative of the rotational position of lower indexing gear 18 when one of light detectors 62A–E is aligned with light emitter 60.

In step S618, the revolution in which the first indexing member is positioned is identified, wherein the identifying is based upon the second signal. For example, logic module 26 may identify whether tone ring 14 is positioned within a revolution from −750° to −720°, from −720° to −360°, from −360° to 0°, from 0° to +360°, from +360° to +720°, or from +720° to +750°. Logic module 26 may identify the revolution based upon the signals from light detectors 62A–E as well as upon the signals from light detectors 48A–C.

Finally, in step S620, the rotational position of the first indexing member within the identified revolution is determined based upon the first signal. In the embodiment discussed above, the rotational position of tone ring 14 within the revolution identified in S618 is determined based upon the signals from light detectors 48A–C.

Logic module 26 may use the signals from light detectors 62A–E to identify respective reference rotational positions occupied by tone ring 14 within the rotational range of tone ring 14. In the embodiment described above, the reference rotational positions are −720°, −360°, 0°, +360° and +720°. More specifically, logic module 26 may use the signals from light detectors 62A–E to identify which one of the revolutions of the rotational range of tone ring 14 that tone ring 14 previously occupied or currently occupies.

Figure 7A:
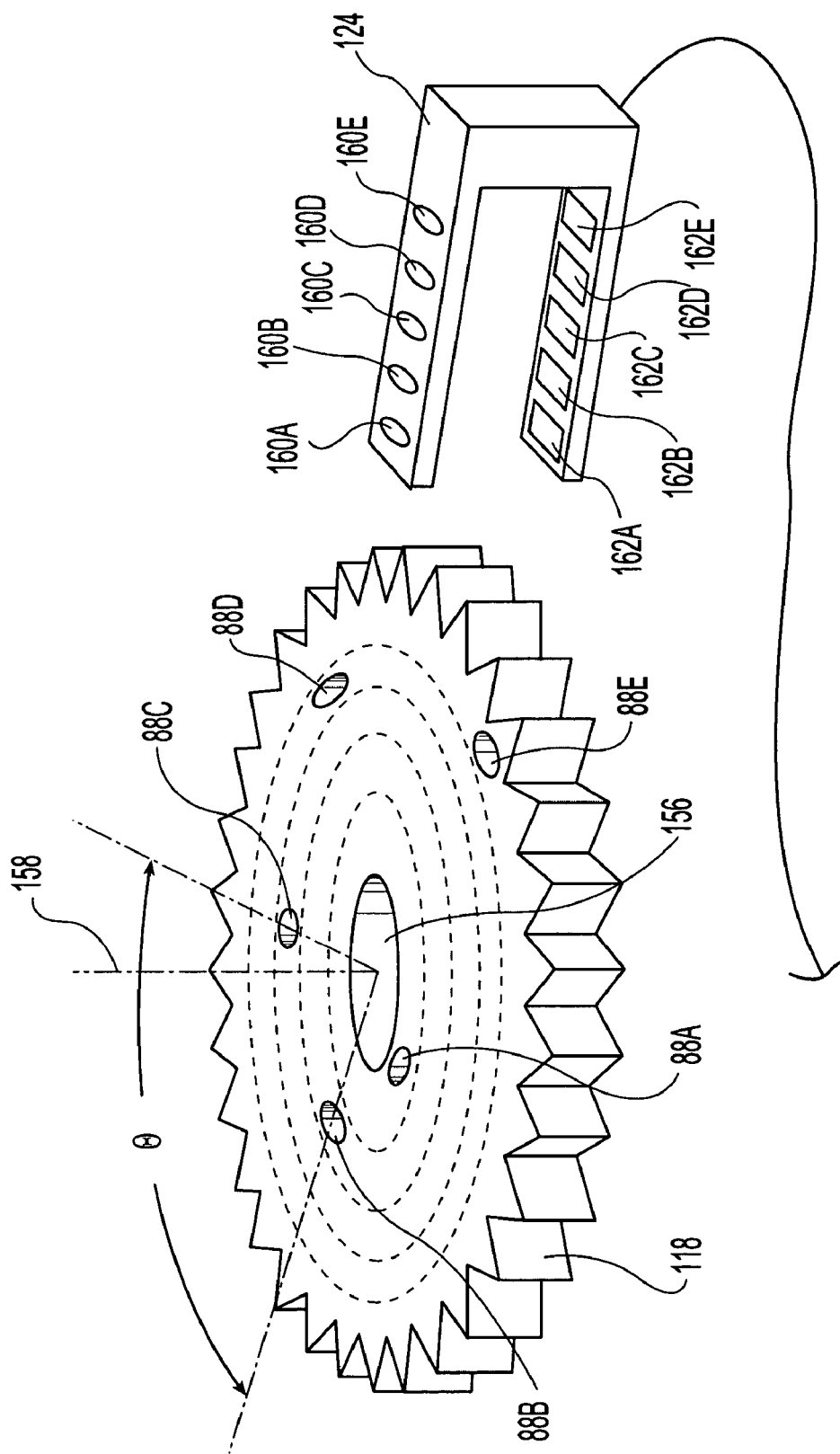
FIG. 7a is a perspective view of another embodiment of the lower indexing gear and lower sensing device of the steering angle sensor assembly of FIG. 1.
Figure 7B:
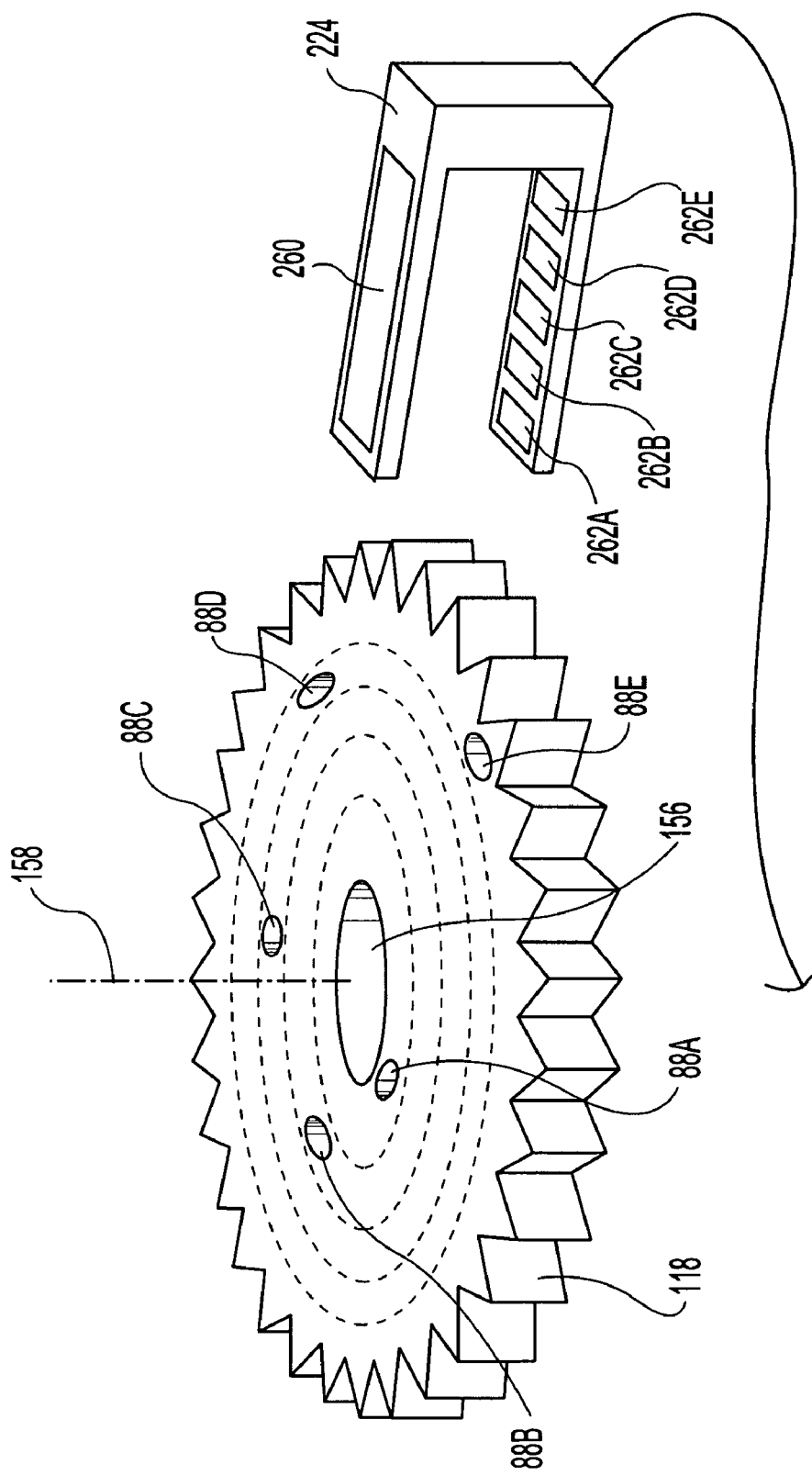
Figure 7C:
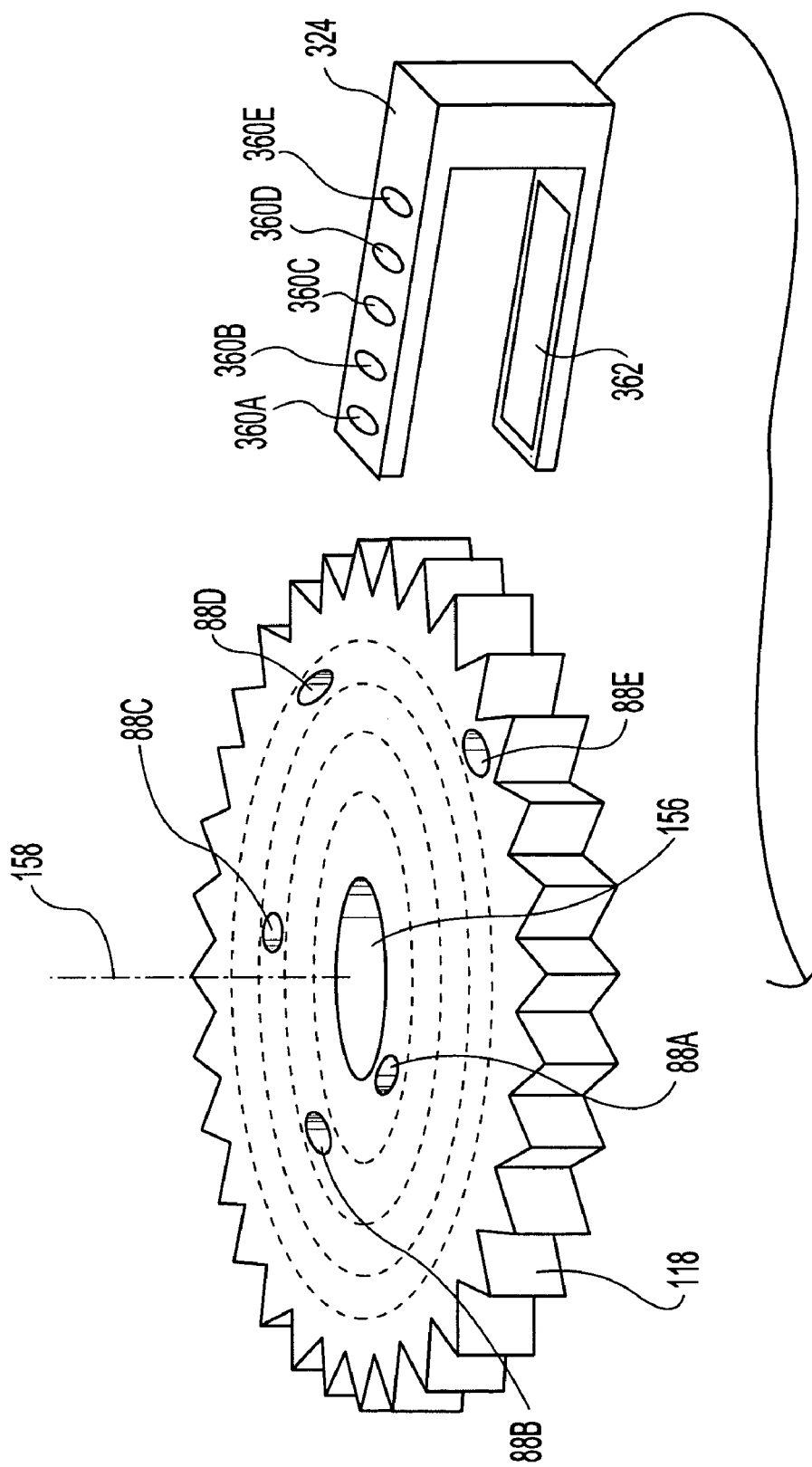

FIGS. 7a, 7b and 7c illustrate alternative embodiments of a lower indexing gear and second sensing device that are suitable for use in a steering wheel sensor assembly of the present invention. More particularly, FIG. 7a illustrates a lower indexing gear 118 and a second sensing device 124 that may be substituted for lower indexing gear 18 and second sensing device 24 of steering wheel sensor assembly 10. Gear 118 includes throughholes 88A–E that are each disposed a different radial distance from a center of central throughhole 156. These different radial distances are illustrated by the imaginary concentric dashed circles included in FIG. 7a. The concentric dashed circles indicate that each of throughholes 88A–E rotates in a respective imaginary "lane" as gear 118 rotates. Each of throughholes 88A–E may be separated from two adjacent other ones of throughholes 88A–E by equal angles that have a common vertex on rotational axis 158. That is, each of throughholes 88A–E may separated from two adjacent other throughholes 88A–E by equal angles θ. Because there are five throughholes 88A–E, there may be five angles θ of 72° (360°/5) separating adjacent pairs of throughholes 88A–E.

Second sensing device 124 includes light emitters 160A–E and corresponding light detectors 162A–E. During assembly, sensing device 124 may be positioned such that light emitters 160A–E and light detectors 162A–E are disposed on opposite sides of lower indexing gear 118. The spacing between individual light emitters 160A–E and individual light detectors 162A–E may be such that each of light detectors 162A–E may come into registration with and receive light from a corresponding one of light emitters 160A–E through a corresponding one of throughholes 88A–E at respective rotational positions of lower indexing gear 118. The respective rotational positions of lower indexing gear 118 at which light detectors 162A–E may receive light, like throughholes 88A–E themselves, may be spaced 72° apart from each other.

Logic module 26 may process the signals from light detectors 162A–E in substantially the same manner that logic module 26 processes the signals from light detectors 62A–E. That is, logic module 26 may use the signals from light detectors 162A–E to identify respective reference rotational positions occupied by tone ring 14 within the rotational range of tone ring 14. More specifically, logic module 26 may use the signals from light detectors 162A–E to identify which one of the revolutions of the rotational range of tone ring 14 that tone ring 14 previously occupied or currently occupies.

In order to allow light emitter 160A to be physically alignable with throughhole 88A without interference from the upper reduction gear, the distance between lower indexing gear 118 and the upper reduction gear may need to be greater than the distance between lower indexing gear 18 and upper reduction gear 50 as shown in FIG. 1. Another structural difference between steering wheel sensor assembly 10 and a steering wheel sensor assembly that includes lower indexing gear 118 and second sensing device 124 is that the need for a mounting member such as mounting member 20 may be eliminated. Otherwise, the features of a steering wheel sensor assembly that includes lower indexing gear 118 and second sensing device 124 may be substantially similar to those of steering wheel sensor assembly 10, and thus are not described in detail herein.

In another embodiment, which is shown in FIG. 7b, a second sensing device 224 includes a single light emitter 260 that emits light that may be received by any of light detectors 262A–E. The operation of second sensing device 224 is substantially similar to that of second sensing device 124, and thus is not discussed in detail herein.

In yet another embodiment, which is shown in FIG. 7c, a second sensing device 324 includes a single light detector 362 that detects light emitted by any of light emitters 360A–E. Light emitters 360A–E may each emit light having at least one different characteristic. For example, light emitters 360A–E may each emit light of a different respective frequency, range of frequencies, or intensity. Light detector 362 may be able to discern which of light emitters 360A–E emitted the light that is received by detector 362 based upon the frequency, intensity, or other characteristic of the received light. Thus, light emitter 362 may transmit a signal to logic module 26 that enables logic module 26 to determine a rotational position of lower indexing gear 118. The operation of second sensing device 324 is substantially similar to that of second sensing device 124 in other respects, and thus is not discussed in detail herein.

In the embodiments disclosed herein, the second sensing device associated with the lower indexing gear is light-based, i.e., emits and receives light, such as visible or infrared light. However, it is to be understood that the second sensing device may also emit and receive radiation in some other frequency range within the electromagnetic spectrum. Further, the second sensing device may be based upon sensing magnetism. For example, one or more stationary Hall sensors may be used to sense the positions of one or more magnets mounted on the rotating lower indexing gear, and thus may be used to determine the rotational position of the lower indexing gear.

The steering angle sensor assembly of the present invention has been described herein as monitoring the rotation of the steering wheel and determining its position after vehicle ignition. However, it is also possible within the scope of the invention for the steering angle sensor assembly to begin operating before vehicle ignition. For example, power may be supplied to the first sensing device, the second sensing device, the logic module, and the vehicle controller when the operator places the key in an "accessory power" position wherein the vehicle battery is electrically connected to various accessories, but ignition is not applied to the engine or motor of the vehicle. This may be particularly useful in applications where the steering wheel can be turned without any power assist from the engine.

While this invention has been described as having an exemplary design, the present invention may be further modified within the spirit and scope of this disclosure. This application is therefore intended to cover any variations, uses, or adaptations of the invention using its general principles.

What is claimed is:

1. A steering angle sensor assembly for use with a vehicle having a rotatable steering mechanism, said assembly comprising:
   a first rotational indexing member operably couplable to the steering mechanism for rotation therewith, said steering mechanism and said first indexing member each being rotatable through a rotational range including a plurality of revolutions, said first indexing member defining a first rotational axis, a plurality of indexing elements being disposed on said first indexing member and circumscribing said first rotational axis;
   a first sensing device positioned to sense said plurality of indexing elements as said first indexing member rotates, said first sensing device outputting a first signal representative of a rotational position of said first rotational indexing member within one of the revolutions;
   a second rotational indexing member defining a second rotational axis;
   a reduction gear mechanism operably coupling said first and second indexing members wherein a rotational displacement of said second indexing member is less than a corresponding rotational displacement of said first indexing member;
   a second sensing device, said second sensing device including a plurality of components, the number of said components being at least as great as the number of said revolutions within the rotational range of said first indexing member, said components being spaced from one another at substantially equal angles relative to the second rotational axis, said second sensing device configured to sense a rotational position of said second rotational indexing member and generate a second signal representative thereof; and
   a logic module receiving said first and second signals, said logic module identifying in which one of the revolutions said first indexing member is positioned based upon said second signal and determining the rotational position of said first indexing member within the identified revolution based upon the first signal.

2. The steering angle sensor assembly of claim 1 wherein said logic module outputs a third signal representative of the identified revolution in which said first indexing member is positioned and the rotational position of said first indexing member within the identified revolution.

3. The steering angle sensor assembly of claim 2 wherein said logic module is configured to transmit the third signal to a vehicle controller.

4. The steering angle sensor assembly of claim 1 wherein the rotational range includes approximately between four and five revolutions.

5. The steering angle sensor assembly of claim 1 wherein said second sensing device includes a light emitter and a light detector, one of said emitter and said detector having a plurality of components, wherein rotation of said second indexing member about said second rotational axis brings each of said plurality of components of one of said emitter and said detector into registration with the other of said emitter and said detector at a respective one of a plurality of rotational positions of said second indexing member, said detector generating the second signal representative of the rotational position of said second indexing member when one of said components of one of said emitter and said detector is in registration with the other of said emitter and said detector.

6. The steering angle sensor assembly of claim 5 wherein each of said components corresponds to a respective point within the rotational range of said first indexing member.

7. The steering angle sensor assembly of claim 5 wherein said second rotational indexing member includes a plurality of throughholes, each of said plurality of components of one of said emitter and said detector coming into registration with the other of said emitter and said detector through a respective one of said throughholes.

8. The steering angle sensor assembly of claim 5 wherein said indexing elements comprise first indexing elements, said first rotational indexing member including a second indexing element, said first rotational indexing member being calibrated relative to said second rotational indexing member such that said first sensing device senses said second indexing element substantially simultaneously with each registration of said plurality of components of one of said emitter and said detector with the other of said emitter and said detector.

9. A steering angle sensor assembly for use with a vehicle having a steering wheel, said assembly comprising:
   a tone ring configured to be operably coupled to the steering wheel such that said tone ring rotates in response to rotation of the steering wheel, said tone ring having a rotational range;
   a first sensing device configured to determine a rotational position of said tone ring and to output a first signal indicative of the rotational position of said tone ring;
   a rotating member;

a reduction gear mechanism operably coupling said tone ring and said rotating member such that a rotational displacement of said rotating member is less than a corresponding rotational displacement of said tone ring;

a second sensing device disposed proximate said rotating member and including a light emitter and a light detector, one of said emitter and said detector comprising a plurality of components, the number of said components at least as great as the number of revolutions within said rotational range of said tone ring, wherein rotation of said rotating member brings each of said plurality of components of one of said emitter and said detector into registration with the other of said emitter and said detector at a respective one of a plurality of rotational positions of said rotating member, said detector generating a second signal representative of the rotational position of said rotating member when one of said components of one of said emitter and said detector is in registration with the other of said emitter and said detector; and a logic module configured to receive and process the first and second signals and to output a third signal representative of an absolute rotational position of the steering wheel.

10. The steering angle sensor assembly of claim 9 wherein the absolute rotational position of the steering wheel has a range of greater than 1440 degrees.

11. The steering angle sensor assembly of claim 9 wherein said logic module is configured to transmit the third signal to a vehicle controller.

12. The steering angle sensor assembly of claim 9 wherein said tone ring is rotatable through a rotational range including approximately between four and five revolutions.

13. The steering angle sensor assembly of claim 9 wherein said components are substantially evenly spaced from each other.

14. The steering angle sensor assembly of claim 9 wherein each of said components corresponds to a respective point within a rotational range of said tone ring.

15. A method of determining a rotational position of a steering wheel, comprising the steps of:

operably coupling a first rotational indexing member to the steering wheel for rotation therewith, the steering wheel and said first indexing member each being rotatable through a rotational range including a plurality of revolutions, a plurality of indexing elements being disposed on said first indexing member;

positioning a first sensing device to sense said plurality of indexing elements as said first indexing member rotates;

outputting a first signal from said first sensing device representative of a rotational position of said first rotational indexing member within one of the revolutions;

providing a second rotational indexing member;

operably coupling said first and second indexing members together via a reduction mechanism wherein a rotational displacement of said second indexing member is less than a corresponding rotational displacement of said first indexing member;

providing a second sensing device including a first component and a plurality of second components, the number of said second components at least as great as the number of revolutions of said first indexing member to which each rotation of said second indexing member corresponds;

rotating said second indexing member to thereby bring each of said plurality of second components into registration with said first component at a respective one of a plurality of rotational positions of said second indexing member;

using said second sensing device to generate a second signal representative of the rotational position of said second indexing member when one of said second components is in registration with said first component;

identifying in which one of the revolutions said first indexing member is positioned, said identifying being based upon said second signal; and determining the rotational position of said first indexing member within the identified revolution, said determining being based upon the first signal.

16. The method of claim 15 comprising the further step of outputting a third signal representative of the identified revolution in which said first indexing member is positioned and the rotational position of said first indexing member within the identified revolution.

17. The method of claim 15 comprising the further step of transmitting the third signal to a vehicle controller.

18. The method of claim 15 wherein the rotational range includes approximately between four and five revolutions.

19. The method of claim 15 wherein said first indexing member defines a first rotational axis, said indexing elements being spaced from each other at substantially equal angles relative to the first rotational axis.

20. The method of claim 19 wherein said second indexing member defines a second rotational axis, said second components being spaced from each other at substantially equal angles relative to the second rotational axis.

21. The method of claim 15 wherein each of said second components corresponds to a respective point within the rotational range of said first indexing member.

22. A steering angle sensor assembly for use with a vehicle having a rotatable steering mechanism, said assembly comprising:

a first rotational indexing member operably couplable to the steering mechanism for rotation therewith, said steering mechanism and said first indexing member each being rotatable through a rotational range of greater than 360°;

a first sensing device configured to sense a rotational position of said first rotational indexing member and generate a first signal indicative thereof;

a second rotational indexing member;

a reduction gear mechanism operably coupling said first and second indexing members wherein a rotational displacement of said second indexing member is less than a corresponding rotational displacement of said first indexing member;

a second sensing device configured to sense a rotational position of said second rotational indexing member and generate a second signal indicative thereof;

said second sensing device including a light emitter and a light detector, one of said emitter and said detector having a plurality of components, rotation of said second indexing member bringing each of said plurality of components of one of said emitter and said detector into registration with the other of said emitter and said detector at a respective one of a plurality of rotational positions of said second indexing member, said detector generating the second signal representative of the rotational position of said second indexing member when one of said components of one of said emitter and said detector is in registration with the other said emitter and said detector;

said first rotational indexing member including an indexing element, said first rotational indexing member being calibrated relative to said second rotational indexing member such that said first sensing device senses said indexing element substantially simultaneously with each registration of said plurality of components of one of said emitter and said detector with the other of said emitter and said detector; and a processor receiving said first and second signals, said processor identifying a reference rotational position previously occupied by said first indexing member, the identifying of the reference rotational position being based upon the second signal, said processor determining a change in the rotational position of said first indexing member relative to the reference rotational position, the determining of the change in the rotational position of said first indexing member being based upon the first signal.

23. The steering angle sensor assembly of claim 22 wherein said processor outputs a third signal representative of an absolute rotational position of said first indexing member based upon the reference rotational position previously occupied by said first indexing member and the change in the rotational position of said first indexing member relative to the reference rotational position.

24. The steering angle sensor assembly of claim 23 wherein said processor is configured to transmit the third signal to a vehicle controller.

25. The steering angle sensor assembly of claim 22 wherein the rotational range is greater than 720°.

26. The steering angle sensor assembly of claim 22 wherein a number of said components is at least as great as the rotational range of the first indexing member divided by 360°.

27. The steering angle sensor assembly of claim 22 wherein said second rotational indexing member includes a plurality of throughholes, each of said plurality of components of one of said emitter and said detector coming into registration with the other of said emitter and said detector through a respective one of said throughholes.

* * * * *